July 13, 1948. J. RUSNOK 2,445,039
TOOL MOUNTING BRACKET
Filed July 19, 1946 2 Sheets-Sheet 1

Inventor:
John Rusnok

July 13, 1948. J. RUSNOK 2,445,039
TOOL MOUNTING BRACKET
Filed July 19, 1946 2 Sheets-Sheet 2

Inventor:
John Rusnok
By Thiess, Olsen & Mecklenburger
Attys

Patented July 13, 1948

2,445,039

UNITED STATES PATENT OFFICE 2,445,039

TOOL MOUNTING BRACKET

John Rusnok, Chicago, Ill.

Application July 19, 1946, Serial No. 684,992

7 Claims. (Cl. 248—278)

The present invention relates to a universal mounting construction for a machine and has special reference to a bracket for adjustably supporting a tool such as a milling head over the usual work-supporting table or bed.

More particularly, this invention relates to a bracket for being mounted on an arm extending above and preferably transversely of the work-supporting table from one side thereof. The bracket is provided with suitable means for being rotatably mounted on the free end of said arm, and a substantially circular flange or rim which, when the bracket is positioned over the arm, extends outwardly on opposite sides and about the end of the arm. Movably mounted about the periphery of the rim is a support for a tool or machine such as a milling head provided with means to permit the tool to be rotated on the support in a plane tangential to the rim of the bracket. The periphery of the bracket rim is preferably of such size that it extends substantially the full width of the work table.

When the bracket is once mounted with the general plane of the rim parallel to the surface of the work-supporting table and the tool is arranged with its spindle or rotor normal to said surface, the tool and its support may be positioned about the rim of the bracket and the spindle will remain normal to the table at all times. As the bracket rim extends substantially the full width of the table, movement of the tool and its support about the rim will permit the spindle of the tool to be arranged at any desired distance from either side of the table.

By rotating the machine about its support in a plane tangential to the bracket rim and rotating the machine support about the rim, the working end of the tool rotor may be moved in arcs concentric to or coaxial with the periphery of of the rim. In addition, the bracket may be rotated about the arm upon which it is mounted. Consequently the spindle or rotor may be easily and quickly set to substantially any angle desired with respect to the work table.

There is thus provided a single, very flexible tool support which is readily adjustable to position the tool spindle either normally to the table or at substantially any desired angle thereto at locations covering the full width of the table and at both sides of the supporting arm.

An object of this invention is to provide a support for a tool or machine such as a milling head for easily and quickly positioning the machine above the work-supporting table.

A further object is to provide such a support having a substantially circular rim or flange and means for positioning the tool or machine at any desired location about the rim.

Another object is to provide a machine or tool support having a circular flange or rim and adjusting means so arranged that when the machine spindle has once been arranged, normal or at any other angle to the work-supporting table, the machine may be moved to other positions about the rim without affecting the original angle of the spindle to the table surface.

Still another object is to provide a machine support by means of which the machine spindle may be set at substantially any angle desired with respect to the table.

Further objects and advantages will be apparent from the following description when considered with the claims and the accompanying drawings, in which latter Fig. 1 is a perspective view of a mounting construction or bracket embodying this invention mounted on an arm and supporting a milling head over a table;

Figure 1:
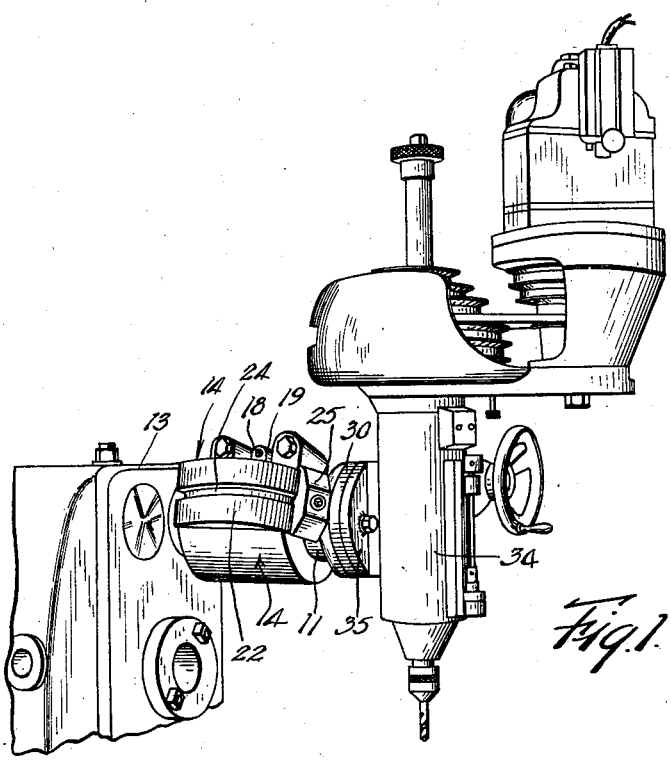
Figure 2:
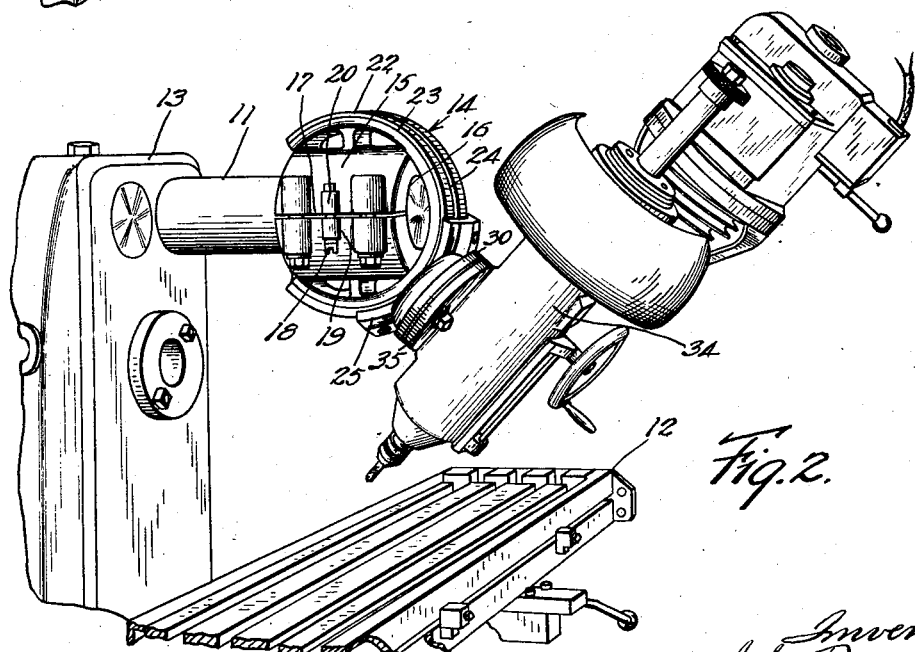
Fig. 2 is a perspective view of the construction shown in Fig. 1 with the parts in changed position.
Figure 3:
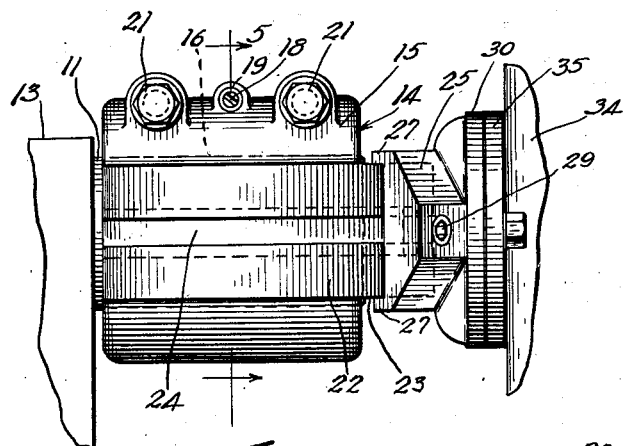
Fig. 3 is a side elevational view of the bracket with the tool support mounted thereon.
Figure 5:
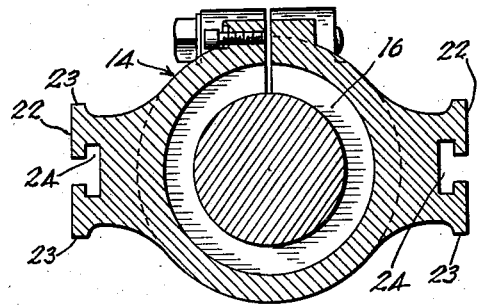
Fig. 5 is a central vertical cross sectional view taken along the line 5—5 of Fig. 3.
Figure 4:
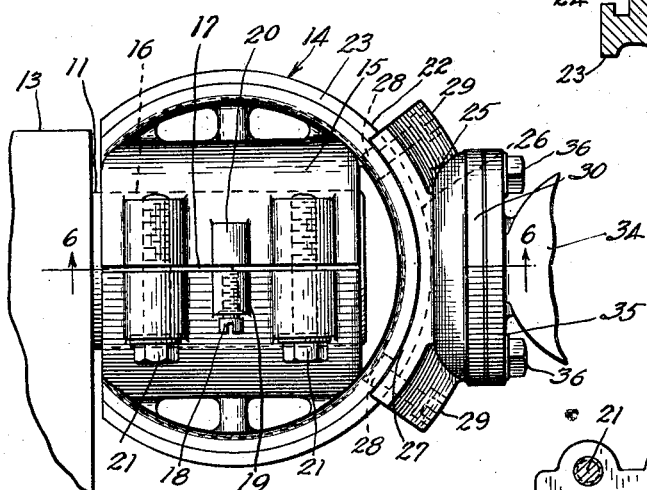
Fig. 4 is a top plan view of the bracket and tool support shown in Fig. 3.
Figure 7:
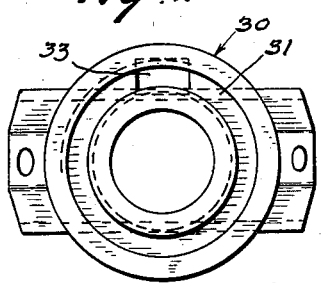
Fig. 7 is a plan view.
Figure 6:
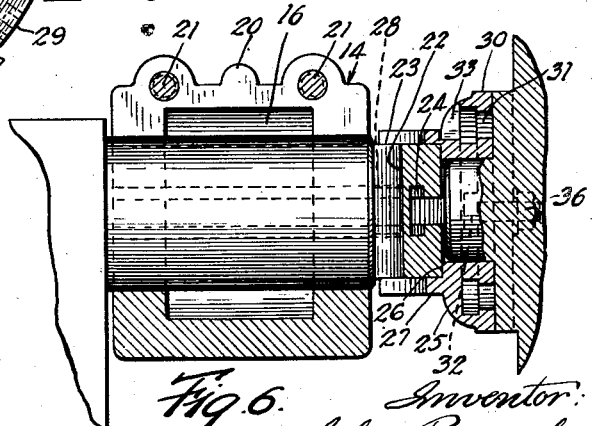
Fig. 6 is a central vertical cross sectional view taken along the line 6—6 of Fig. 4.

Referring more particularly to the drawings, a mounting construction embodying the present invention is shown mounted on an arm 11 extending above and transversely of a work-supporting table 12 from a standard 13 positioned at one side of the table. The table may be arranged for longitudinal reciprocating movement as is customary.

The mounting construction shown supporting a milling head comprises a bracket 14 having a central portion 15 in which a bore 16 is provided for fitting over the end of the arm 11. A slot 17 is cut in the top of the central portion 15 of the bracket longitudinally of the bore and extends from the bore to the outer surface of the central portion 15. In order to move the sides of the slot away from each other to facilitate placing the bracket over the arm, a spreader screw 18 is threaded into the tapped opening provided therefor in the projecting portion 19 and is adapted to engage a stop 20 mounted opposite therefrom on the other side of the slot. By rotating the spreader screw 18 the width of the slot may be increased to permit the bracket to be mounted over the arm. After the bracket has been positioned as desired about the arm, bracket bolts 21 may be tightened to force the sides of the slot toward each other and fixedly clamp the bracket in position.

Projecting outwardly from the central portion 15 is an interrupted circular flange or rim 22, which extends from the rear of one side of the bracket around the front and to the rear of the opposite side of the bracket. The rear of the bracket may be cut off straight as shown, this being the side through which the arm 11 extends. The circular rim or flange is of substantial width and is provided with oppositely facing flat bearing surfaces 23 at each side of the periphery. Extending inwardly from the periphery of the rim 22 is a groove 24 which is preferably T-shaped in cross section so that the entrance of the groove is narrower than the inner width thereof. The groove preferably extends all the way around the rim. The bracket is preferably of such a size that the distance from the straight cut-off at the rear thereof to the opposite or front side is substantially equal to the width of the work-supporting table over which it is mounted.

A tool or machine-supporting member or segment 25 having a concave arcuate face 26 for fitting over the bracket rim 22 is provided. The concave face of the supporting member 25 fits about the periphery of the rim 22 and projecting flanges 27 engage the bearing portions 23 of the rim. The tool-supporting member 25 is held in position on the rim 22 by means of lugs or shoes 28 positioned in the enlarged cross portion of the groove 24. Bolts 29, preferably of the socket type, extend through the ends of the tool-supporting member and thread into the lugs or shoes 28. By loosening the bolts the tool-supporting member 25 may be moved about the bracket rim 22 and then clamped in any desired position by tightening the bolts 29.

The tool-supporting member 25 is provided with an outer circular platform or bearing portion 30 which lies in a general plane tangential to both the tool-supporting member 25 and the flange or rim 22. Extending inwardly from the face of the bearing portion 30 and concentric with the periphery thereof is a groove 31, T-shaped in cross section. Shoes or lugs 32 are positioned in the wide portion of the groove 31, an opening 33 being provided to permit their insertion in the groove.

The tool 34 to be supported is provided with a base 35 for abutting the bearing portion 30 of the supporting member 25. Bolts 36 in the tool base 35 thread into the shoes 32 to provide a clamping action. When the bolts 36 are loosened the tool or machine base may be rotated on the portion 30 of the supporting member 25 and when the bolts are tightened the tool base is held fixed with respect to the supporting member 25.

With a mounting construction as above described, the bracket 14 may be rotated about the arm 11 and fixed in any position. The tool-supporting member 25 may be positioned at any point about the rim 22 of the bracket 14 and the tool may be rotated on the tool-supporting member 25 in a plane tangential to the rim of the bracket.

In addition to the adjustments just referred to, a tool such as a milling head is generally provided with means for longitudinally adjusting the rotor or spindle thereof. Consequently, the tool may be positioned at any point about the rim 22 and at substantially any angle desired to the surface of the table and do effective work on an object mounted on the work-supporting table.

Instead of providing the bracket 14 with a central portion 14 having a bore 16 therein which extends diametrically of the flange 22, other means may be provided for mounting the bracket on the arm 11 and it is not necessary that the axis of the arm be diametric to the bracket. If desired the axis of the arm may also be on either side of the general plane of the rim 22.

While I have shown and described a preferred embodiment of the present invention is is to be understood that changes and modifications may be made therein without departing from the present invention and, therefore, I wish to be limited only by the prior art and the appended claims.

I claim:

1. A mounting construction for adjustably mounting a tool above a work-supporting table comprising a member having a substantially annular rim portion, means for rotatably mounting said member about an axis parallel to the surface of said table with the general plane of said rim portion capable of being positioned parallel to the surface of said table, and a supporting member for connection with said tool mounted on said rim portion and adjustable thereabout.

2. A mounting construction for adjustably mounting a tool above a work-supporting table comprising a member having a substantially annular rim portion, means for rotatably mounting said member about an axis lying in the general plane of said rim portion and parallel to the general plane of said table, and a supporting member for connection with said tool mounted on said rim portion and adjustable thereabout.

3. A mounting construction for adjustably mounting a tool above a work-supporting table comprising a member having a substantially annular rim portion, means for rotatably mounting said member about an axis parallel to both the general plane of the table and the transverse axis thereof with the general plane of said rim portion capable of being positioned parallel to the surface of said table, and a supporting member for connection with said tool mounted on said rim portion and movable thereabout.

4. A mounting construction for adjustably mounting a tool above a work-supporting table comprising a member having a substantially annular rim portion, means for rotatably mounting said member about an axis lying in the general plane of said rim portion and parallel to both the general plane of the table and the transverse axis thereof, and a supporting member for connection with said tool mounted on said peripheral portion and movable thereabout.

5. A mounting construction for adjustably mounting a tool above a work-supporting table which comprises a member having a substantially annular rim portion and provision for being mounted with the general plane of said rim portion parallel to the surface of said table, a supporting member for connection with said tool mounted on said rim portion, said rim portion having a groove extending thereabout in the periphery of said rim, and adjustable clamping means connected to said supporting member riding in said groove, said clamping means acting to guide said supporting member about said rim portion and to clamp said supporting member to said rim at any point thereabout.

6. A mounting construction for adjustably mounting a tool above a work-supporting table which comprises a member having a substantially annular rim portion and provision for being mounted with the general plane of said rim portion parallel to the surface of said table, said rim portion having a groove extending thereabout in the periphery of said rim, adjustable clamping means connected to said supporting member and riding in said groove for guiding said supporting member about said rim and clamping it to said rim at any point, and means associated with said supporting member for supporting said tool thereon.

7. A mounting construction for adjustably mounting a tool on an arm extending above and transversely of a work-supporting table comprising a member having a substantially annular rim portion, said member having a bore extending diametrically of said rim portion for fitting over said arm, and a supporting member for connection with said tool mounted on said rim and movable thereabout.

JOHN RUSNOK.

REFERENCES CITED

The following references are of record in the file of this patent:

UNITED STATES PATENTS

| Number | Name | Date |
| --- | --- | --- |
| 1,097,588 | Jackson | May 19, 1914 |